(12) United States Patent
Luo et al.

(10) Patent No.: US 7,221,786 B2
(45) Date of Patent: May 22, 2007

(54) METHOD FOR AUTOMATIC CONSTRUCTION OF 2D STATISTICAL SHAPE MODEL FOR THE LUNG REGIONS

(75) Inventors: Hui Luo, Rochester, NY (US); David H. Foos, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 742 days.

(21) Appl. No.: 10/315,855

(22) Filed: Dec. 10, 2002

(65) Prior Publication Data

US 2004/0109594 A1 Jun. 10, 2004

(51) Int. Cl.
G06K 9/00 (2006.01)
G06K 9/46 (2006.01)
(52) U.S. Cl. .................... 382/132; 382/203
(58) Field of Classification Search ........... 382/128, 382/132, 203
See application file for complete search history.

(56) References Cited

U.S. PATENT DOCUMENTS

| 5,435,310 A | 7/1995 | Sheehan et al. |
| 5,601,084 A | 2/1997 | Sheehan et al. |
| 6,594,378 B1 * | 7/2003 | Li et al. ............ 382/128 |
| 6,716,175 B2 * | 4/2004 | Geiser et al. ............ 600/450 |
| 2003/0095692 A1 * | 5/2003 | Mundy et al. ............ 382/128 |
| 2005/0207630 A1 * | 9/2005 | Chan et al. ............ 382/131 |

OTHER PUBLICATIONS

Stegmann et al. "A Brief Introduction to Statistical Shape Analysis" Mar. 2002. ☐☐http://www2.imm.dtu.dk/pubdb/views/edoc_download.php/403/pdf/imm403.pdf.*
Hick et al. "Automatic Landmarking for Building Biological Shape Models" Proc. International Conf. on Image Processing 2002, vol. 2, pp. 801-804.*
Ginneken et al. "Active Shape Model Segmentation with Optimal Features" IEEE Transactions on Medical Imaging, vol. 21, No. 8, Aug. 2002, 924-933.*
Shen et al., Conference Paper—Abstract only, Sch. of Compu. Studies, Leeds University; UK, "Computer Analysis of Images and Patterns".

(Continued)

Primary Examiner—Matthew C. Bella
Assistant Examiner—Utpal Shah

(57) ABSTRACT

A method for automatic construction of 2D statistical shape models for the lung regions in chest radiographic images comprising: providing a radiographic image of the chest region of an individual; by performing a manual contour tracing, extracting the lung region shape instances from the chest radiographic image; by using a shape alignment algorithm, aligning all shape instances as closely as possible to a pre-defined template shape; and generating a statistical model shape of the lung regions by principle component analysis using the aligned shape instances.

6 Claims, 9 Drawing Sheets

OTHER PUBLICATIONS

Romdhani et al., "A Generic face appearance model of shape and texture under very large pose variations from profile views", IEEE, 2000, pp. 1060-1063.

C. Lorenz et al., Generation of Point-Based 3D Statistical Shape Models For Anotomical Objects, CVIU, vol. 77, No. 2, Feb. 2000, pp. 175-191.

C. Davatzikos et al., A Computerized Approach For Morphological Analysis Of The Corpus Callosum, J. Computer Assisted Tomography, vol. 20, 1996, pp. 88-97.

J. Duncan et al., Measurement Of Non-rigid Motion Using Contour Shape Descriptors, IEEE Conference on Computer Vision and Pattern Recognition, 1991, pp. 318-324.

C. Kambhamettu et al., Point Correspondence Recovery In Non-rigid Motion, IEEE Conference on Computer Vision and Pattern Recognition, 1992, pp. 545-561.

A. Hill et al., A Framework for Automatic Landmark Identification Using A New Method Of Nonrigid Correspondence, IEEE Trans. Pattern Analysis and Machine Intelligence, vol. 22, No. 3, 2000, pp. 241-251.

E.M. Arkin et al., An Efficiently Computable Metric For Comparing Polygonal Shapes, IEEE Trans. On Pattern Analysis and Machine Intelligence, vol. 13, No. 3, 1991, pp. 209-215.

* cited by examiner

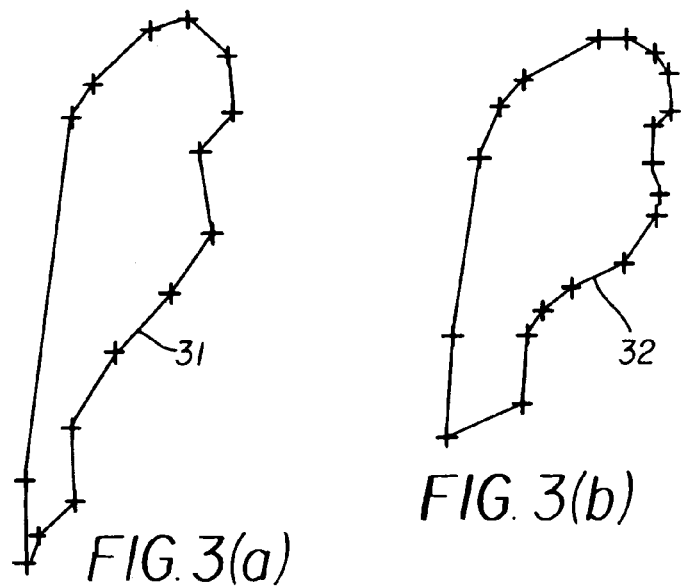
FIG. 3(a)
FIG. 3(b)
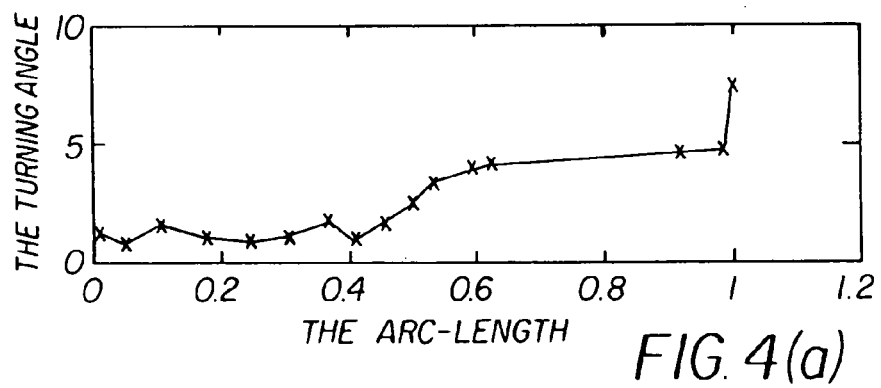
FIG. 4(a)
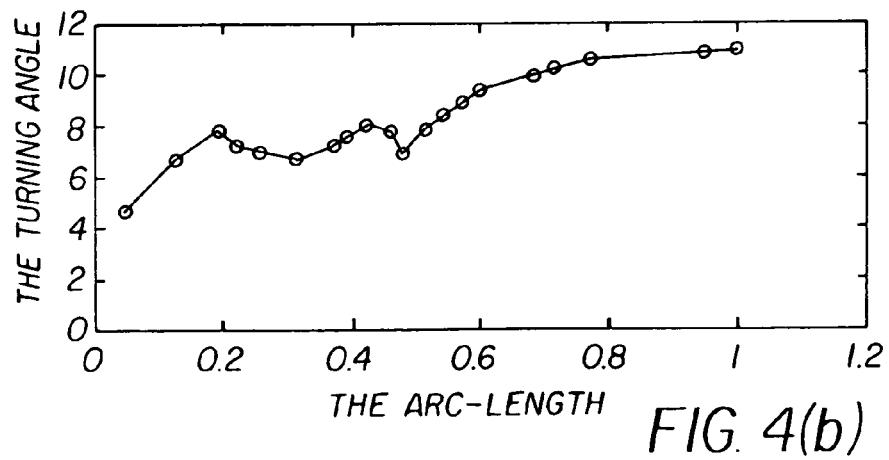
FIG. 4(b)

FIG. 11(a.)

METHOD FOR AUTOMATIC CONSTRUCTION OF 2D STATISTICAL SHAPE MODEL FOR THE LUNG REGIONS

FIELD OF THE INVENTION

This invention relates in general to lung shape modeling, and in particular to a method for automatically constructing two-dimension (2D) statistical shape model of the lung regions from sets of chest radiographic images.

BACKGROUND OF THE INVENTION

The use of shape as an anatomical object property is a rapidly increasing portion of research in the field of medical image analysis. Shape representations and shape models have been used in connection with segmentation of medical images, diagnosis, and motion analysis. Among different types of shape models, Active Shape Models (ASMs) have been frequently applied and proven a powerful tool for characterizing objects and segmenting medical images. In order to construct such models, sets of labeled training images are required. The labels in the training sets consist of landmark points defining the correspondences between similar structures in each image across the set. Manual definition of landmarks on 2D shapes has proven to be both time-consuming and error prone. To reduce the burden, semi-automatic systems have been developed. In these systems, a model is built from the current set of examples, and used to search the next image. The user can edit the result where necessary, then add the example to the training set. Though this can considerably reduce the time and effort required, labeling large sets of examples is still labor intensive.

Because of the importance of landmark labeling, a few attempts have been made to automate the shape alignment/average process. For example, Lorenz and Krahnstover automatically locate candidates for landmarks via a metric for points of high curvature, Lorenz C., Krahnstove N. *Generation of point-based 3D statistical shape models for anatomical objects.* CVIU, vol. 77 no. 2, February 2000, pp. 175-191. Davatzikos et al. used curvature registration on contours produced by an active contour approach, (C. Davatzikos, M. Vaillant, S. M. Resnich, J. L. Prince, S. Letovsky, and R. N. Bryan, *A Computerized Approach for Morphological Analysis of the Corpus Callosum, J. Computer Assisted Tomography* vol. 20, 1996, pp. 88-97). Duncan et al. (J. Duncan, R. L. Owen, L. H. Staib, and F. Anandan, *Measurement of non-rigid motion using contour shape descriptors, in IEEE Conference on Computer Vision and Pattern Recognition,* 1991, pp. 318-324). And Kambhamettu et al, (C. Kambhamettu and D. B. Goldgof, *Point correspondence recovery in non-rigid motion, IEEE Conference on Computer Vision and Pattern Recognition,* 1992, pp. 545-561), propose methods of correspondence based on the minimization of a cost function that involves the difference in the curvature of two boundaries. However, as pointed out by several studies, curvature is a rigid invariant of shape and its applicability is limited in case of nonlinear shape distortions. In addition, it is hard to find sufficient high curvature points on lung contours.

Hill et al. employed a sparse polygonal approximation to one of two boundaries which is transformed onto the other boundary via an optimization scheme, (A. Hill, C. J. Taylor, and A. D. Brett, *A Framework for Automatic Landmark Identification Using a New Method of Nonrigid Correspondence, IEEE Trans. Pattern Analysis and Machine Intelligence,* vol. 22, no. 3, 2000, pp. 241-251). The polygonal matching is based on an assumption that arc path-lengths between consecutive points are equal. This assumption may be violated in case of severe shape difference and is especially difficult to satisfy in polygonal approximation of lung shape contours.

As a result, the prior art does not fit the lung shape modeling very well, therefore there exists a need for a method for automatically constructing 2D statistical shape model of lung regions in chest radio graphs.

SUMMARY OF THE INVENTION

According to the present invention, a method is provided for automatic construction of 2-D statistical shape models for the lung regions in chest radiographic images. The method makes use of a set of shape instances of lung regions from chest images, and automatically aligns them to a pre-defined template shape using the $L_2$ distance and Procrustes distance analysis. Once the training shapes are appropriately aligned, a set of landmarks is automatically generated from each shape. Finally, a 2D statistical model is constructed by Principle Component Analysis. The statistical shape model consists of a mean shape vector to represent the general shape and variation modes in the form of the eigenvectors of the covariance matrix to model the differences between individuals.

ADVANTAGEOUS EFFECT OF THE INVENTION

The invention has the following advantages.
1. The entire alignment and labeling process is automatic.
2. The time and effort required to label sets of data is dramatically reduced.
3. User bias introduced by manual labeling is avoided.

BRIEF DESCRIPTION OF THE DRAWINGS

Preferred embodiments of the present invention will be described below in more detail, with reference to the accompanying drawings:

FIG. 3(a) is a diagrammatic view illustrating the polygonal shape approximations $T_p$ computed from the template shape.

FIG. 3(b) is a diagrammatic view illustrating the polygonal shape approximations $S_p$ computed from a shape instances.

FIG. 4(a) is a diagrammatic view of turning angle vs. arc-length showing the turning function $\theta_{Tp}(s)$ of the template shape.

FIG. 4(b) is a diagrammatic view of turning angle vs. arc-length showing the turning function $\theta_{Sp}(s)$ of the shape instance.

FIG. 11(a) is a diagrammatic view which shows the effects of varying the first parameter of the left lung shape model by two standard deviations.

DETAILED DESCRIPTION OF THE INVENTION

Figure 12:
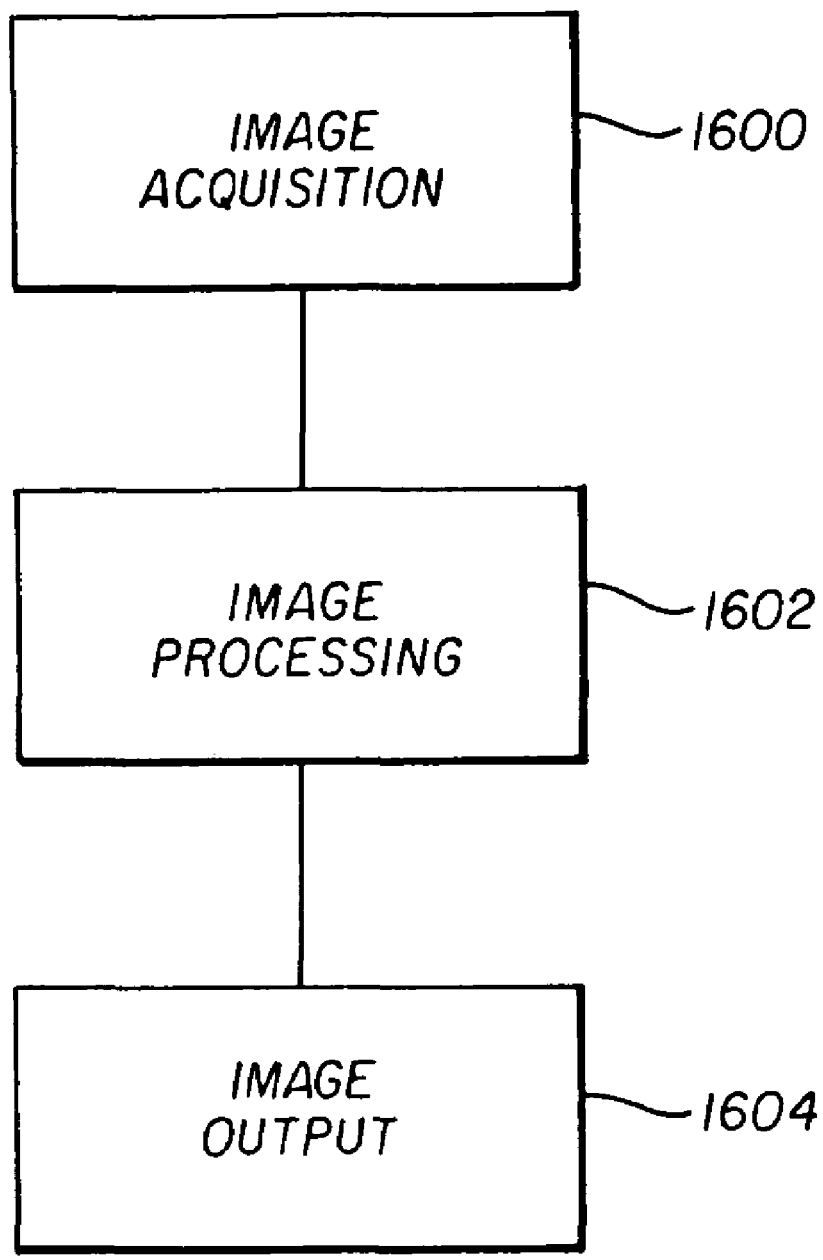
FIG. 12 is a block diagram of a radiographic imaging system incorporating the present invention.

The present invention relates in general to the processing of chest radiographic images. FIG. 12 is a block diagram of a radiographic system incorporating the present invention. As shown a radiographic image, such as a chest radiographic image is acquired by an image acquisition system 1600. Image acquisition system 1600 can include one of the following: (1) a conventional radiographic film/screen system in which a body part (chest) of a patient is exposed to x-radiation from an x-ray source and a radiographic image is formed in the radiographic image is formed in the radiographic film. The film is developed and digitized to produce a digital radiographic image. (2) A computed radiography system in which the radiographic image of the patient's body part is formed in a storage phosphor plate. The storage phosphor plate is scanned to produce a digital radiographic image. The storage phosphor plate is erased and reused. (3) A direct digital radiography system in which the radiographic image of the patient's body part is formed directly in a direct digital device which directly produces a digital radiographic image.

The digital radiographic image is processed according to the present invention by image processing system 1602. System 1602 is preferably a digital computer or digital microprocessor by can include hardware and firmware to carry out the various image processing operations.

The processed digital radiographic image is provided to image output 1604, such as a high resolution electronic display or a printer which produces a hard copy (film) of the processed radiographic image. The original as well as the processed image can be transmitted to a remote location, can be stored in a radiographic image storage system (PACS), etc.

Figure 1:
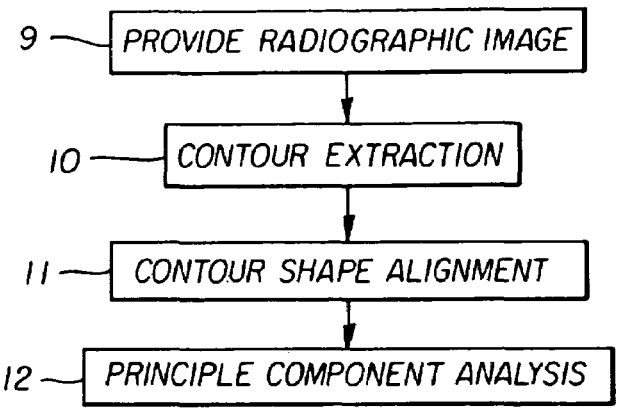
FIG. 1 is a flowchart illustrating the overall scheme for the automated method for constructing 2D statistical shape models of lung regions.

The present invention discloses a method for automatically constructing 2D statistical shape models for lung regions, which is based on the combination of three processing steps as shown in FIG. 1. First, a digital radiographic image of chest regions of a patient is provided (box 9) for digital image processing. Then a manual contour tracing is first performed to extract the lung region contours from the chest radiographs (box 10). Later a shape alignment algorithm is used to align all shape instances as closely as possible to a pre-defined template shape (box 11). Finally, a statistical shape model is generated by principle component analysis using the aligned shape instances (box 12).

Figure 2:
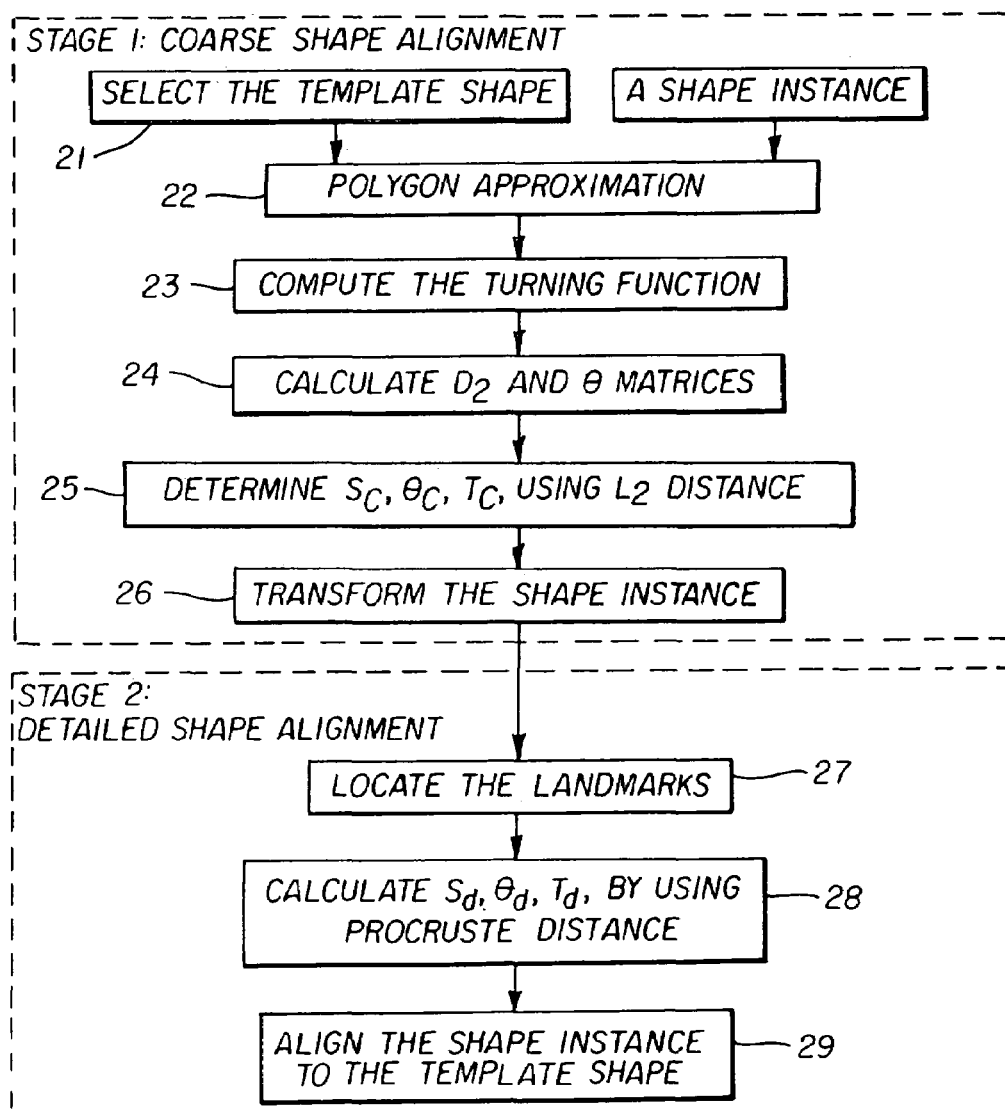
FIG. 2 is a block diagram illustration of the shape alignment algorithm.

The most difficult issue in the alignment is the one-to-one correspondence between different shape instances. The present invention provides an efficient method to achieve this goal by first searching a set of landmarks related to the shape features along the shape contour, and then filling the segments between them with a fixed number of equidistant landmarks. The method includes two stages, as shown in FIG. 2. In the first stage (the coarse shape alignment), a template shape is selected (box 21), and for each shape instance, a scale, rotation and translation are computed based on the $L_2$ distance between the turning functions of the two polygons, which are used to approximate the template shape and the shape instance. In the second stage of the process (detailed shape alignment), sets of corresponding points are defined and a least-squares type (Procrustes) distance is computed for a more detailed shape alignment.

In the present invention, a polygonal shape approximation is computed to simplify the representation of a shape (box 22) and a turning function $\theta(s)$ is defined to measure the angle of the counter clockwise tangent from a reference point $\bigcirc$ on the shape approximation (box 23). The reference point orientation $\theta(\bigcirc)$ is associated with the image coordinates (such as the x-axis). $\theta(s)$, as a function of the arc-length s, keeps track of the turning that takes place, increasing with left-hand turns and decreasing with right-hand turns, as shown in FIGS. 4(a) and 4(b). To ensure generality, the perimeter length of each polygon is normalized. Thus for a simple closed contour, $\theta(s)$ starts at $\theta(\bigcirc)$ (assuming that the reference point $\bigcirc$ is placed at differential point along the contour) and increases to $\theta(1)=\theta(\bigcirc)+2\pi$. The function $\theta(s)$ has several properties that make it especially suitable for shape alignment. It is piecewise constant for polygons, making computations particularly easy and fast. According to the definition, the function $\theta(s)$ is invariant under translation and scaling to the polygon. Rotation of the polygon corresponds to a simple shift of $\theta(s)$ in the $\theta$ direction (the vertical direction), while changing the location of the reference point $\bigcirc$ by an amount $t\in[0, 1]$ along the perimeter of polygon corresponds to a horizontal shift of the function $\theta(s)$.

In the implementation of coarse shape alignment, the method chooses one shape instance as the template shape T, whose size is close to the mean size of all shape instances. Then two polygonal shape approximations $T_p$ and $S_p$ are computed from the template shape 31 and a shape instances 32, respectively, as shown in FIGS. 3(a) and 3(b). The degree to which $T_p$ and $S_p$ are similar can be measured by taking the minimal $L_2$ distance between the turning functions $\theta_{T_p}(s)$ and $\theta_{S_p}(s)$, as defined by $$D_2^{T_p, S_p}(t, \theta) = \left( \min_{\theta \in R, t \in [0,1]} \int_0^1 |\theta_{T_p}(s+t) - \theta_{S_p}(s) + \theta|^2 \, ds \right)^{\frac{1}{2}} \quad (1)$$

where t represents the position of the reference point along the polygon, and $\theta$ corresponds to the rotation of polygon. Based on the proofs given by Arkin et al. (E. M. Arkin, L. P. Chew, D. P. Huttenlocher, K. Kedem, and J. S. Mitcheel, *An efficiently computable Metric for Comparing*

*Polygonal shapes. IEEE Trans. On Pattern Analysis and Machine Intelligence*. vol. 13, no. 3, 1991, pp. 209-215), this problem can be solved by $$D_2^{T_p,S_p}(t,\theta) = \left\{ \min_{t \in [0,1]} \left[ \int_0^1 (\theta_{T_p}(s+t) - \theta_{S_p}(s))^2 ds - (\theta*(t))^2 \right] \right\}^{\frac{1}{2}} \quad (2)$$

Where $\theta^*$ is the optimal orientation for any fixed t which is given by $$\theta^* = \int_0^1 \theta_{Sp}(s)ds - \int_0^1 \theta_{Tp}(s)ds - 2\pi t \quad (3)$$

By solving the above equations, two matrices are obtained (box 24). One is $D_2$ matrix from Eq. (2) and the other is $\theta_c$ matrix from Eq. (3). The correct orientation of the shape instance can be found by searching the minimal $L_2$ distance in $D_2$ matrix and the corresponding element in $\theta_c$ matrix (box 25). As for the other two parameters, the scale is simply determined from the perimeters of two shapes.

$$s_c = P_{Sp}/P_{Tp} \quad (4)$$

The translation can be calculated from the gravity centers of two shapes $$t_c = t_{Tp} - t_{Sp} \quad (5)$$

Figure 5B:
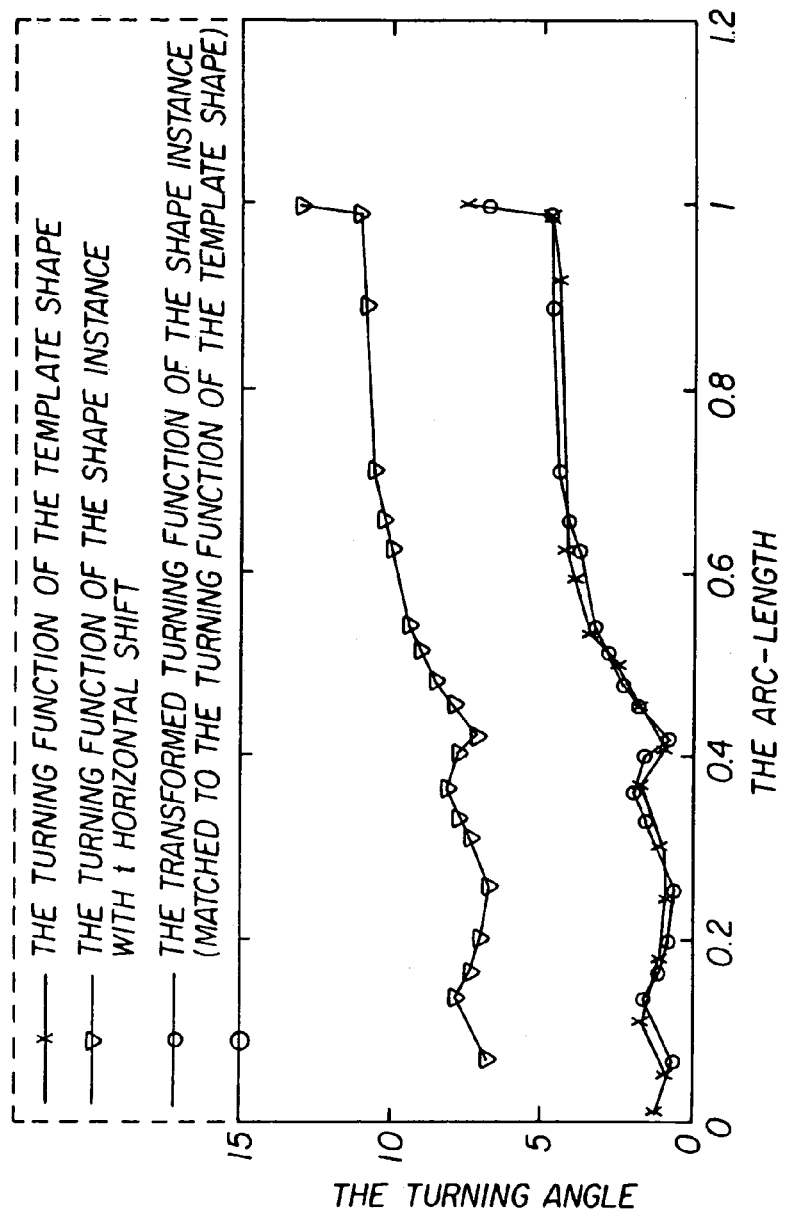
FIG. 5(b) is a graphical view of turning angle vs. arc-length illustrating the relationships of the turning functions in the coarse shape alignment.
Figure 5A:
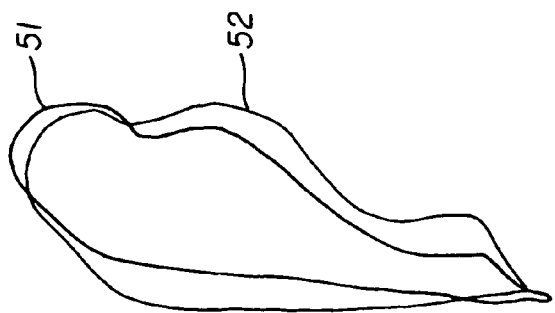
FIG. 5(a) is a diagrammatic view showing the result of the coarse shape alignment.

Once the coarse shape alignment is done (box 26), the shape instance 52 is well aligned with the template shape 51, as shown in FIG. 5. However, this result still leaves a space for a more accurate alignment. Thus, in the second stage, the aim is to improve the alignment by minimizing the Procrustes distance between the template shape contour and the shape instance contour.

Figure 6:
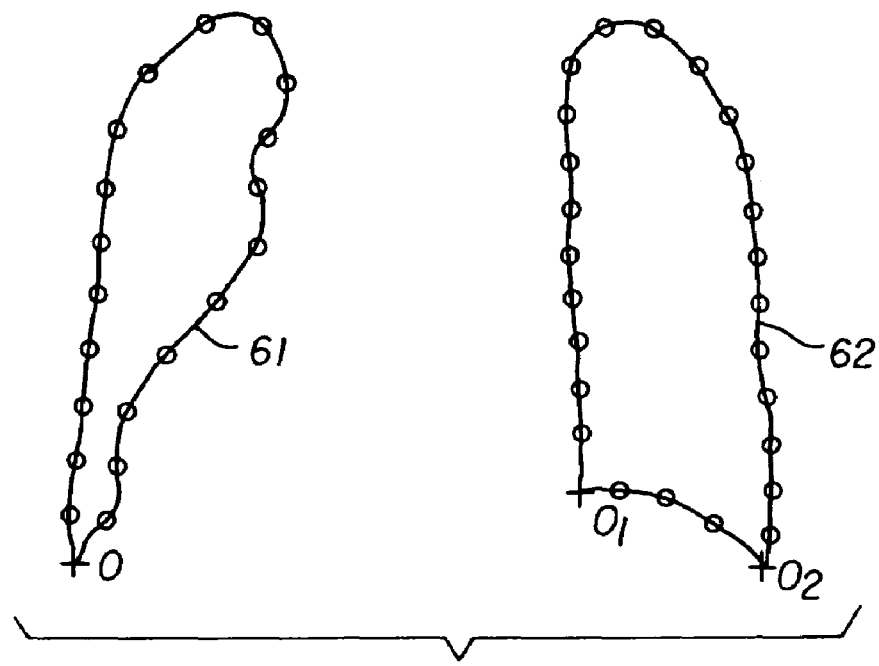
FIG. 6 illustrates the determination of landmarks on the left and right lung shape contours.

To compute the Procrustes distance, a crucial requirement is to correctly define point correspondence between the template shape and shape instance, which can be easily achieved after the coarse shape alignment. The idea is that, first of all, some landmarks related to the shape features are located along the shape contour. For example, in FIG. 6, the landmark ○ on the left lung contour 61 and the landmarks ○1 and ○2 on the right lung contour 62. Then, a fixed number of equidistance points are filled in each segment between the located landmarks (box 27). Finally a list of vertices is constructed where each vertex represents a landmark point and the index order is correspond to the counter-clockwise direction along the contour. This last step is very important since it ensures that all elements with the same index represent corresponding shape information.

Figures 7A, 7B:
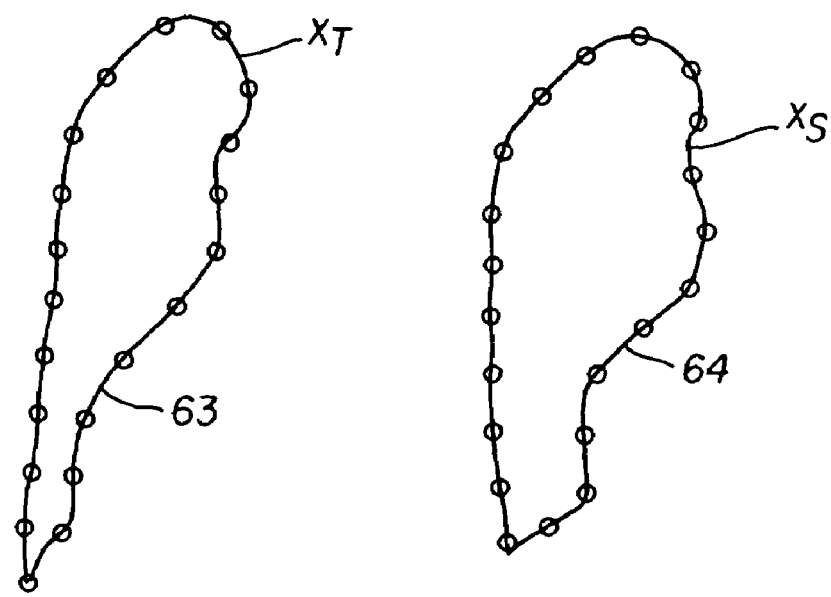
FIGS. 7(a) and 7(b) are diagrammatic views respectively showing the corresponding landmark points on the template shape and the shape instance.

Given the template shape vector $X_T$ (63) and the shape instance vector $X_S$, (64) as shown respectively in FIGS. 7(a) and 7(b), an appropriate rotation $\theta_d$, a scale $s_d$ and a translation $t_d = (t_{dx}, t_{dy})$ are chosen (box 28) and mapped onto $M(X_S) + t_d$ to minimize the weighted sum (box 29).

$$E = (X_T - M(s_d, \theta_d)X_s - t_d)^T W(X_T - M(s_d, \theta_d)X_s - t_d) \quad (6)$$

Where $$M(s_d, \theta_d) = \begin{bmatrix} s_{dx} & 0 \\ 0 & s_{dy} \end{bmatrix} \begin{bmatrix} \cos\theta & -\sin\theta \\ \sin\theta & \cos\theta \end{bmatrix} \quad (7)$$

Figure 8:
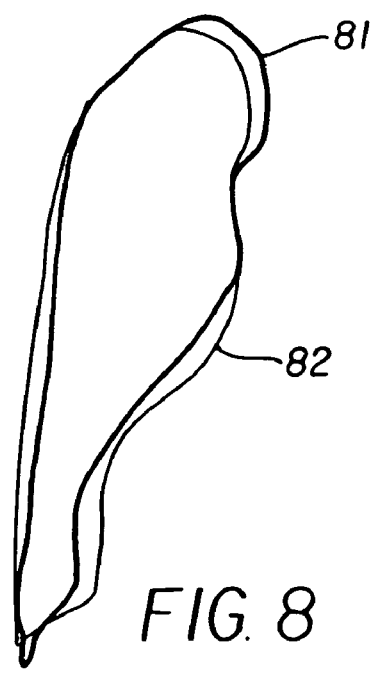
FIG. 8 is a diagrammatic view displaying the final alignment result.

W is a diagonal matrix of weights for each landmark. In the present invention, the weights are chosen to give more significance to those landmarks related to anatomical structures. FIG. 8 shows the final alignment result of the template shape 81 and the shape instance 82 after the detailed alignment.

Figure 9:
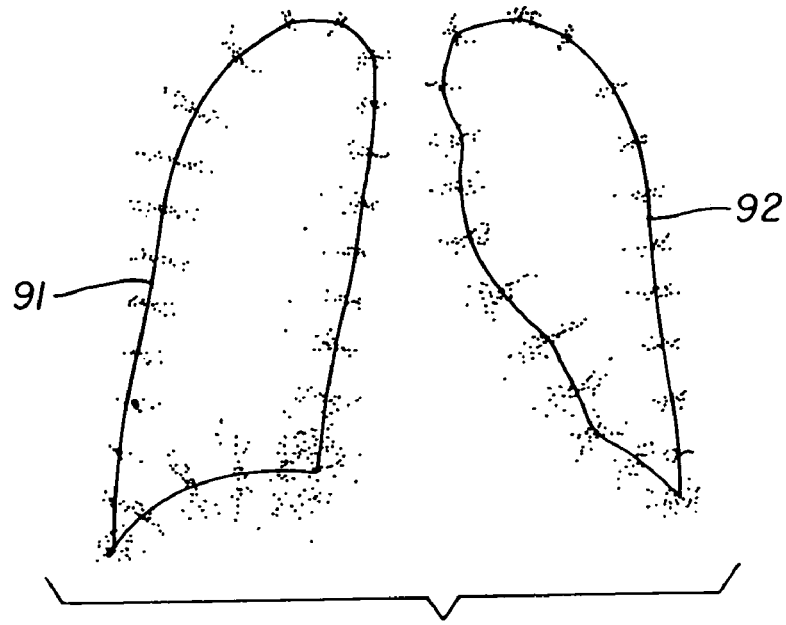
FIG. 9 is a diagrammatic view which the Procrustes average shape. The clouds are landmarks from the aligned set of shape instances.

After the shape alignment, there is a one-to-one correspondence between the vector elements of a given index, which ensures the vector element represents corresponding shape information. By taking the average of the coordinates of the corresponding vertices, a mean shape can be generated for left lung 91 and right lung 92, as shown in FIG. 9, and the shape model variation can be also analyzed by applying a principal component analysis on the training data. Each computed principal component gives a 'model of variation', a way in which the landmark points tend to move together as the shape varies.

For the 2D lung shape models in the present invention, there are N landmarks on the shape contour. So a 2N*2N covariance matrix S is calculated by using $$S = \frac{1}{M}\sum_{i=1}^{M}(x^i - \bar{x})(x^i - \bar{x})^T \quad (8)$$

Where $x^i$ is a shape instance, $\bar{x}$ is the mean shape. M is the total number of the shape instances.

One particularly useful property of this matrix is that it can demonstrate variation in some directions more than in others. These variations' directions and importance may be derived from an eigen-decomposition of S by solving the equation $$Sp_i = \lambda_i p_i \quad (9)$$

Solutions to Eq. (9) provide the eigenvector $p_i$ and their eigenvalues $\lambda_i$ of S. Conventionally, these eigenvalues are sorted in the decreasing order. It can be shown that the eigenvectors associated with larger eigenvalues correspond to the directions of larger variation in the underlying training data.

Note that any shape in the training set can be approximated using the mean shape and a weighted sum of these deviations obtained from the first t modes.

$$x \approx \bar{x} + P_t b_t \quad (10)$$

Where $b = (b_1, b_2, b_3, \ldots b_t)$ is the vector of weights, which indicates how much variation is exhibited with respect to each of the eigenvectors.

The present invention has been used to generate 2D statistical shape models of lung regions from 65 training contours. FIGS. 10(a)-10(l) show some training shapes of the lung region selected from a database. Each shape contour is created by a user delineating the lung region boarders.

Figures 10A, 10B, 10C:
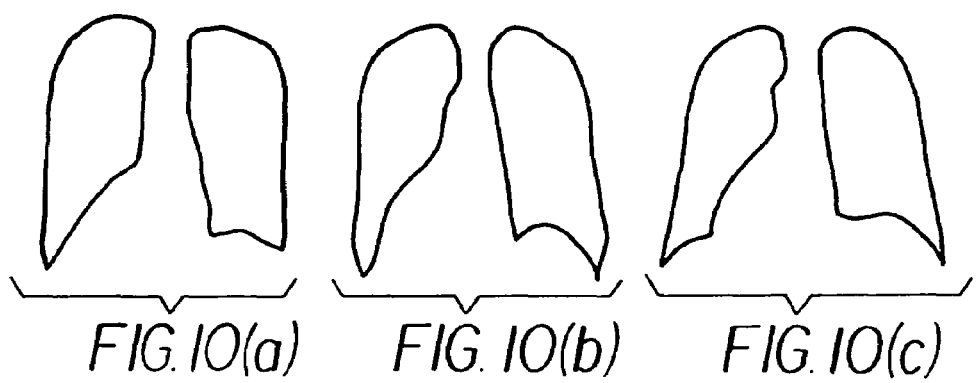
FIGS. 10(a) and 10(l) show some training shapes of the lung region selected from a database.
Figures 10D, 10E, 10F:
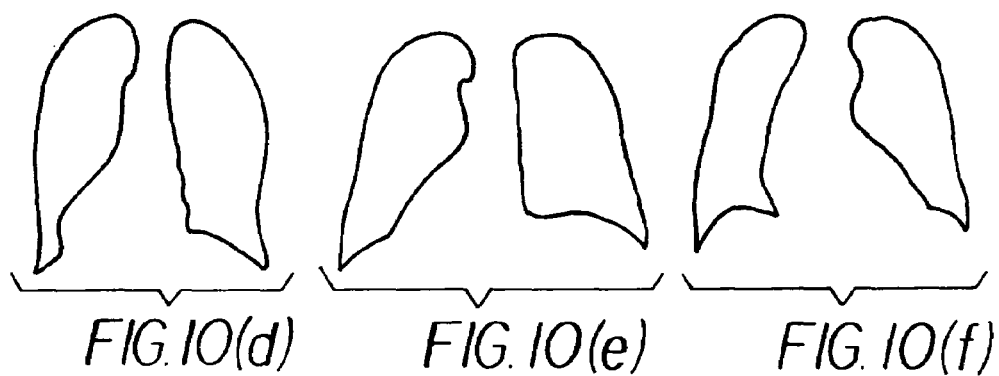
Figures 10G, 10H, 10I:
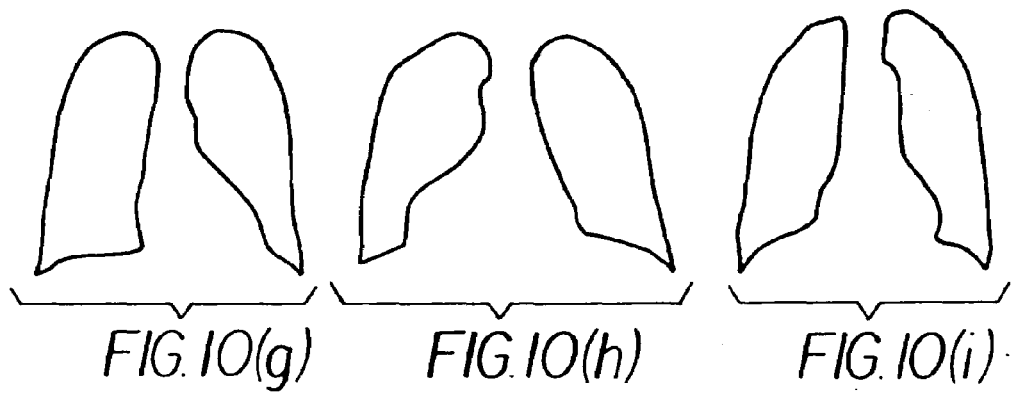
Figures 10J, 10K, 10L:
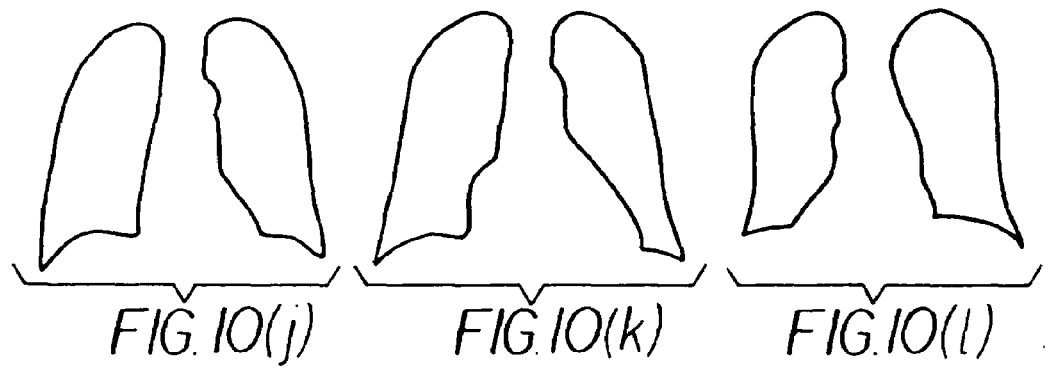
Figure 11B:
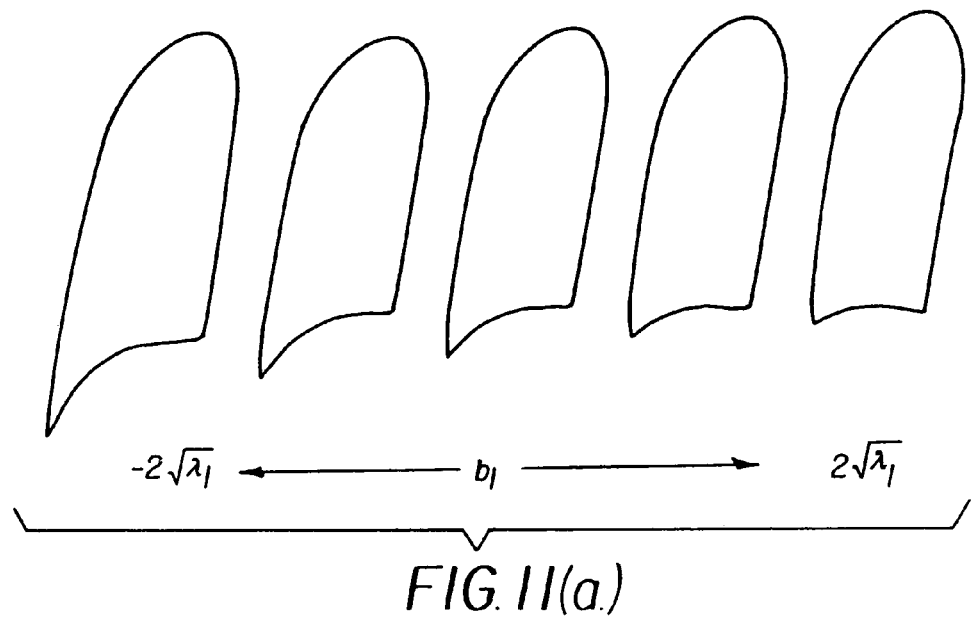
FIG. 11(b) is a diagrammatic view which shows the effects of varying the second parameter of the left lung shape model by two standard deviations.
Figure 11B:
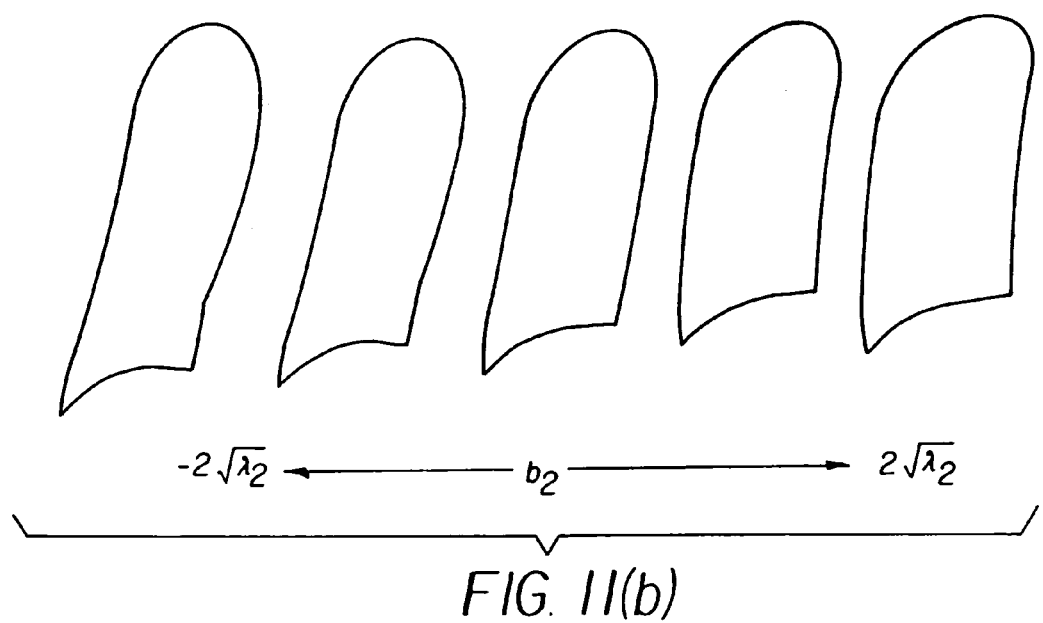
Figure 11C:
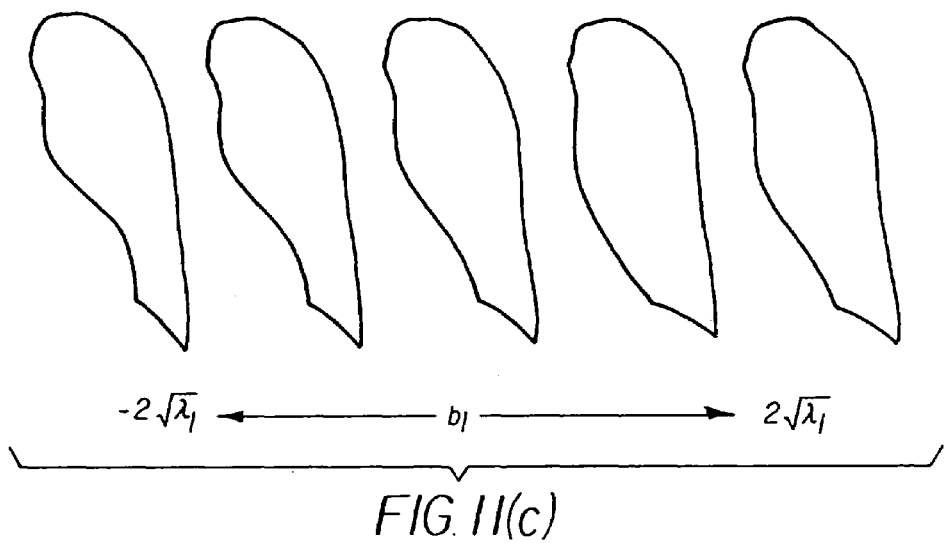
FIG. 11(c) is a diagrammatic view which shows the effects of varying the first parameter of the right lung shape model by two standard deviations.
Figure 11D:
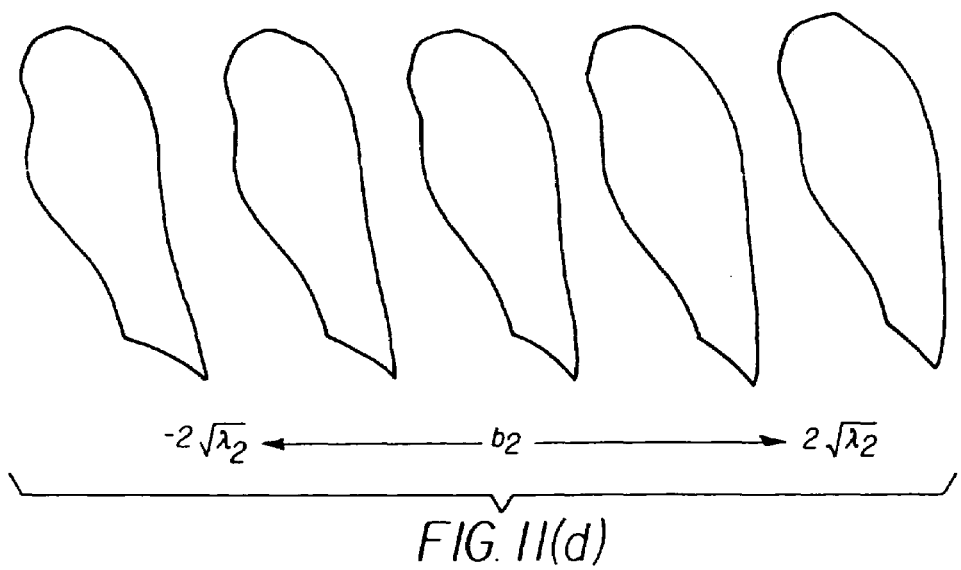
FIG. 11(d) is a diagrammatic view which shows the effects of varying the second parameter of the right lung shape model by two standard deviations.

FIGS. 11(a) and 10(b) show the shape variation by varying the first two model parameters. In particular, FIG. 11(a) shows the effects of varying the first parameter of the left lung shape model. FIG. 11(b) shows the effects of varying the second parameter of the left lung shape model. FIG. 11(c) shows the effects of varying the first parameter of the right lung shape model. FIG. 11(d) shows the effects of varying the second parameter of the right lung shape model.

In summary, a method for automatically constructing a 2D statistical shape model for lung region in chest radiograph is provided. Given a set of lung region shape instances, the method generated the mean shape of lung region by automatically aligning the training shape instances, selecting landmarks, and finally deriving a statistical model by principle component analysis. This method has been successfully applied to a set of 65 lung region shape data sets. As expected, a large portion of total shape variability is captured with the first few eigenvectors. The present method can also be used to construct the shape models of other anatomical structures, such as bones and organs.

The invention has been described in detail with particular reference to certain preferred embodiments thereof, but it will be understood that variations and modifications can be effected within the spirit and scope of the invention.

PARTS LIST 9 radiographic image
10 contour extraction
11 contour shape alignment
12 principle component analysis
21 template shape
22 polygon approximation
23 shape approximation
24 multiple matrices
25 corresponding element
26 coarse shape alignment
27 located landmarks
28 translation chosen
29 minimize the weighted sum
31 template shape
32 shape instances
51 template shape
52 shape instance
61 left lung contour
62 right lung contour
63 shape vector
64 shape instance vector
81 template shape
82 shape instance
91 left lung
92 right lung
1600 image acquisition system
1602 image processing system
1604 image output

What is claimed is:

1. A method for automatic construction of 2D statistical shape models for the lung regions in chest radiographs, comprising:
   extracting the anatomical structure contours from a chest radiograph image;
   rigidly aligning shape instances to a template shape using a coarse shape alignment algorithm;
   optimizing the alignment of shape instances to said template shape by a detailed shape alignment process; and
   generating a statistical shape model using said aligned shape instances;
   wherein said coarse shape alignment process includes:
   creating a template shape;
   computing the minimal distance and associated transformation parameters between said template shape and a shape instance; and
   transforming the shape instance based on the transformation parameters.

2. The method of claim 1, wherein said computing the minimal distance includes;
   computing the polygon approximations from said template shape and a shape instance;
   computing the minimal distance between said polygon approximations; and
   determining the associated scale, rotation, and translation parameters using the minimal distance.

3. The method of claim 2, wherein said computing the minimal distance includes:
   computing the turning functions of said polygon approximations; and
   searching the minimal distance between said turning functions.

4. A method for automatic construction of 2D statistical shape models for the lung regions in chest radiographs, comprising:
   extracting the anatomical structure contours from a chest radiograph image;
   rigidly aligning shape instances to a template shape using a coarse shape alignment algorithm;
   optimizing the alignment of shape instances to said template shape by a detailed shape alignment process; and
   generating a statistical shape model using said aligned shape instances;
   wherein said detailed shape alignment process includes:
   locating landmarks related to the shape features along the shape contours;
   calculating the transformation parameters using the distance between the template shape landmarks and the instance shape landmarks; and
   transforming the shape instance based on the transformation parameters.

5. The method of claim 4, wherein locating landmarks includes:
   choosing a certain polygon vertices with salient shape features as landmarks; and
   locating a fixed number of equidistant points between said landmarks as the rest of the landmarks.

6. The method of claim 4 wherein calculating the transformation parameters is carried out using the Procrustes distance.

* * * * *